US012256202B2

(12) United States Patent
Chen et al.

(10) Patent No.: US 12,256,202 B2
(45) Date of Patent: Mar. 18, 2025

(54) STEREO ENHANCEMENT SYSTEM AND STEREO ENHANCEMENT METHOD

(71) Applicant: INTELLIGO TECHNOLOGY INC., Zhubei (TW)

(72) Inventors: Chia-Ping Chen, Zhubei (TW); Chih-Sheng Chen, Zhubei (TW); Hua-Jun Hong, Zhubei (TW); Chien-Hua Hsu, Zhubei (TW); Jen-Feng Li, Zhubei (TW); Wei-An Chang, Zhubei (TW); Tsung-Liang Chen, Zhubei (TW)

(73) Assignee: INTELLIGO TECHNOLOGY INC., Zhubei (TW)

( * ) Notice: Subject to any disclaimer, the term of this patent is extended or adjusted under 35 U.S.C. 154(b) by 260 days.

(21) Appl. No.: 18/062,653

(22) Filed: Dec. 7, 2022

(65) Prior Publication Data

US 2024/0022855 A1 Jan. 18, 2024

(30) Foreign Application Priority Data

Jul. 15, 2022 (TW) ................................. 111126730

(51) Int. Cl.

*H04R 3/00* (2006.01)
*H04R 1/40* (2006.01)
*H04S 7/00* (2006.01)

(52) U.S. Cl.

CPC ............ *H04R 3/005* (2013.01); *H04R 1/406* (2013.01); *H04S 7/303* (2013.01);

(Continued)

(58) Field of Classification Search

CPC .... H04R 3/005; H04R 1/406; H04R 2203/12; H04R 2430/23; H04S 7/303; H04S 2420/01

See application file for complete search history.

(56) References Cited

U.S. PATENT DOCUMENTS 10,397,697 B2 * 8/2019 Lambert .................. H04R 1/08
10,715,933 B1 * 7/2020 Ma ....................... H04R 25/405

(Continued)

FOREIGN PATENT DOCUMENTS

TW 202211696 A * 3/2022
WO WO-2016131471 A1 * 8/2016 ............... H04S 1/00

OTHER PUBLICATIONS

TW Office Action dated 2023-09-18 in Taiwan application No. 111126730.

*Primary Examiner* — Oyesola C Ojo

(74) *Attorney, Agent, or Firm* — McClure, Qualey & Rodack, LLP

(57) ABSTRACT

The invention discloses a stereo enhancement system and a stereo enhancement method. The stereo enhancement system includes a beamforming unit and a signal processing unit. The beamforming unit is used for receiving a plurality of input sound signals and generating a plurality of beamforming sound signals corresponding to a plurality of direction intervals respectively. The signal processing unit is coupled to the beamforming unit and used for receiving the plurality of beamforming sound signals corresponding to the plurality of direction intervals respectively and generating a first synthesized output sound signal and a second synthesized sound signal accordingly.

18 Claims, 8 Drawing Sheets

(52) U.S. Cl.
CPC ...... *H04R 2203/12* (2013.01); *H04R 2430/23* (2013.01); *H04S 2420/01* (2013.01)

(56) References Cited

U.S. PATENT DOCUMENTS

| | | | | |
|---|---|---|---|---|
| 10,764,676 | B1 * | 9/2020 | Luo | H04R 5/02 |
| 2015/0230026 | A1 * | 8/2015 | Eichfeld | H04R 25/407 381/26 |
| 2017/0353804 | A1 * | 12/2017 | Homayoun | G10L 21/0364 |
| 2018/0352334 | A1 * | 12/2018 | Family | H04R 1/403 |
| 2020/0204932 | A1 * | 6/2020 | As'Ad | H04R 25/505 |
| 2021/0136501 | A1 * | 5/2021 | Ma | H04R 25/407 |
| 2021/0136508 | A1 * | 5/2021 | Donley | H04R 1/406 |
| 2022/0141604 | A1 * | 5/2022 | Udesen | H04R 25/407 381/315 |
| 2023/0329913 | A1 * | 10/2023 | Li | G10L 15/22 |

* cited by examiner

STEREO ENHANCEMENT SYSTEM AND STEREO ENHANCEMENT METHOD

BACKGROUND OF THE INVENTION

1. Field of the Invention

The invention relates to stereo enhancement; in particular, to a stereo enhancement system and a stereo enhancement method.

2. Description of the Prior Art

In general, as shown in FIG. 1, because the distance and the mechanism of the microphone 10 of the conventional recording device 1 are not easy to simulate the human ear EAR, the distance between the left ear and the right ear and the effect of the head covering sound cannot be represented. As a result, the sound SOU recorded by the microphone 10 of the recording device 1 has a poor stereo effect, and sounds less spatial sense, which needs to be improved.

SUMMARY OF THE INVENTION

Therefore, the invention provides a stereo enhancement system and a stereo enhancement method to solve the above-mentioned problems of the prior arts.

A preferred embodiment of the invention is a stereo enhancement system. In this embodiment, the stereo enhancement system includes a beamforming unit and a signal processing unit. The beamforming unit is configured to receive a plurality of input sound signals and generate a plurality of beamforming sound signals corresponding to a plurality of direction intervals respectively. The signal processing unit is coupled to the beamforming unit and configured to receive the plurality of beamforming sound signals corresponding to the plurality of direction intervals respectively and generate a first synthesized output sound signal and a second synthesized sound signal accordingly.

In an embodiment, the signal processing unit includes: a plurality of head-related transfer function (HRTF) units, coupled to the beamforming unit and corresponding to the plurality of direction intervals respectively, and each HRTF unit in the plurality of HRTF units receiving a corresponding beamforming sound signal in the plurality of beamforming sound signals and calculating the beamforming sound signal to generate a first output sound signal and a second output sound signal; a first synthesis unit, coupled to the plurality of HRTF units, configured to synthesize a plurality of first output sound signals generated by the plurality of HRTF units into the first synthesized output sound signal; and a second synthesis unit, coupled to the plurality of HRTF units, configured to synthesize a plurality of second output sound signals generated by the plurality of HRTF units into the second synthesized output sound signal.

In an embodiment, there is an overlap between the angle ranges included in the plurality of direction intervals.

In an embodiment, the plurality of input sound signals is from a recording device, and all or part of recording range of the recording device is divided into the plurality of direction intervals, so that the beamforming unit generates the plurality of beamforming sound signals relative to all direction intervals of the recording device.

In an embodiment, the first output sound signal and the second output sound signal generated by each HRTF unit correspond to a left ear and a right ear respectively.

In an embodiment, the first synthesis unit and the second synthesis unit output the first synthesized output sound signal and the second synthesized output sound signal to a left ear and a right ear respectively.

In an embodiment, sound fields of the first synthesized output sound signal and the second synthesized output sound signal are wider than sound fields of the plurality of input sound signals.

In an embodiment, the plurality of HRTF units is operated in a real recording mode.

In an embodiment, the plurality of HRTF units is operated in a simulation mode and includes at least one of the following: a filtering unit, configured to simulate a level difference and a time difference between two ears; a delay unit, configured to simulate the time difference between the two ears; and a gain unit, configured to simulate the level difference between the two ears.

In an embodiment, the signal processing unit further includes: a sound detection unit, coupled between the beamforming unit and the plurality of HRTF units, configured to detect whether the plurality of beamforming sound signals corresponding to the plurality of direction intervals includes effective sounds and output beamforming sound signals including the effective sounds to the plurality of HRTF units respectively.

In an embodiment, the signal processing unit adjusts a width of a sound field by modifying a delay and a gain of the plurality of HRTF units.

Another preferred embodiment of the invention is a stereo enhancement method. In this embodiment, the stereo enhancement method includes the following steps: (a) generating a plurality of beamforming sound signals corresponding to a plurality of direction intervals according to a plurality of input sound signals respectively; (b) calculating each of the plurality of beamforming sound signals according to an algorithm to generate a first output sound signal and a second output sound signal corresponding to each of the plurality of direction intervals; and (c) synthesizing a plurality of first output sound signals into a first synthesized output sound signal and synthesizing a plurality of second output sound signals into a second synthesized output sound signal.

In an embodiment, the algorithm is a head-related transfer function (HRTF) or a technology simulating a channel response of a sound source to a left ear and a right ear.

In an embodiment, the step (a) further detects whether the plurality of beamforming sound signals corresponding to the plurality of direction intervals includes effective sounds and the plurality of beamforming sound signals generated in the step (a) includes the effective sounds.

In an embodiment, the stereo enhancement method further includes the following steps: adjusting a width of a sound field by modifying a gain and a delay of HRTF and other techniques simulating channel response of the sound source to the left ear and the right ear.

In an embodiment, there is an overlap between the angle ranges included in the plurality of direction intervals.

In an embodiment, the plurality of input sound signals is from a recording device, and all or part of recording range of the recording device is divided into the plurality of direction intervals, so that the step (a) generates the plurality of beamforming sound signals relative to all or part of direction intervals of the recording device.

In an embodiment, sound fields of the first synthesized output sound signal and the second synthesized output sound signal are wider than sound fields of the plurality of input sound signals.

In an embodiment, the step (b) is operated in a real recording mode, which uses at least one of filter, delay and gain generated from real recording.

In an embodiment, the step (b) is operated in a simulation mode, which uses at least one of filter, delay and gain generated from simulation and the stereo enhancement method further includes at least one of the following: simulating a time difference between two ears; and simulating a level difference between the two ears.

Compared to the prior art, the stereo enhancement system and the stereo enhancement method of the invention separate the plurality of sound signals recorded by the microphone array into different channels corresponding to different sound direction intervals through the beamforming method, and apply head-related transfer function (HRTF) processing in each channel to enhance the spatial sense of the sound signal, so that the sound signal presents a better stereo effect, making the sound heard by the left ear and the right ear wider.

The advantage and spirit of the invention may be understood by the following detailed descriptions together with the appended drawings.

BRIEF DESCRIPTION OF THE APPENDED DRAWINGS

FIG. 1 illustrates a schematic diagram showing that the distance and mechanism of the microphone of a conventional recording device are difficult to simulate the human ear, resulting in a lack of space for the recorded sound.

FIG. 2 and FIG. 3 respectively illustrate different embodiments of dividing the sound collection range of the recording device into a plurality of direction intervals and a plurality of head-related transfer function (HRTF) units respectively located in different sound direction intervals.

DETAILED DESCRIPTION OF THE INVENTION

A preferred embodiment of the invention is a stereo enhancement system. In this embodiment, the stereo enhancement system can retain all the input sound signals recorded by the microphone array of the recording device and separate all the input sound signals into different channels corresponding to different sound direction intervals through the beamforming method, and then separate the input sound signals in each sound direction. The head-related transfer function (HRTF) processing is applied in each channel to enhance the spatial sense of the sound signal, thereby the stereo effect of the sound signal is effectively enhanced to make the sound heard by the left ear and the right ear more spacious.

Figure 1:
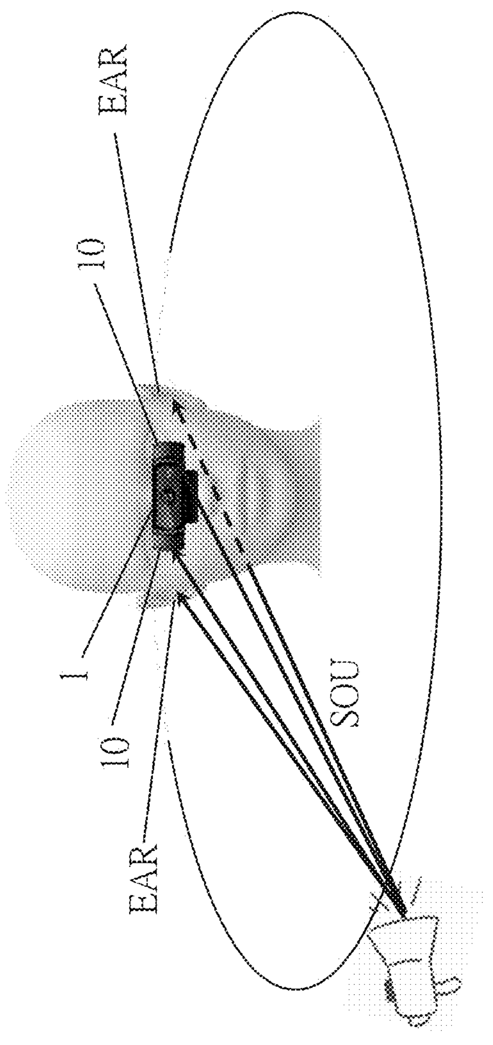
Figure 2:
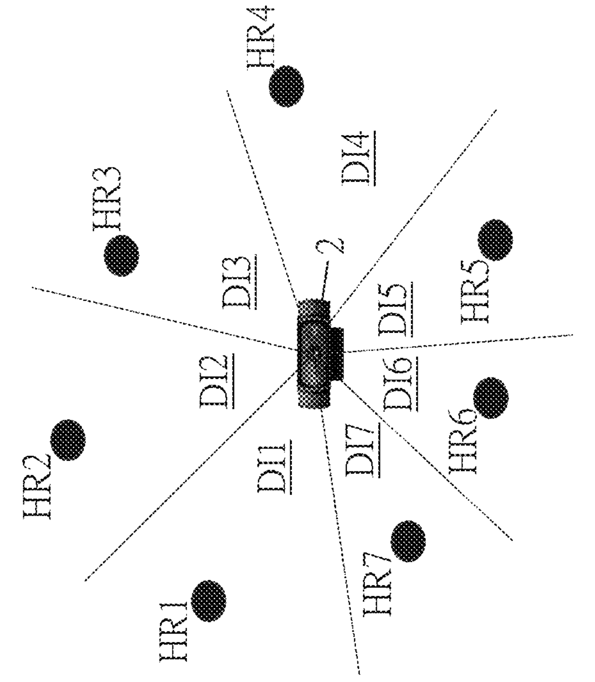
Figure 3:
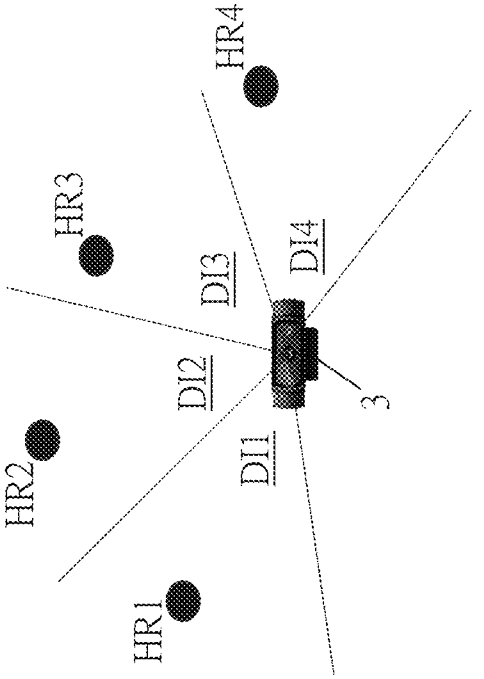
Figure 4:
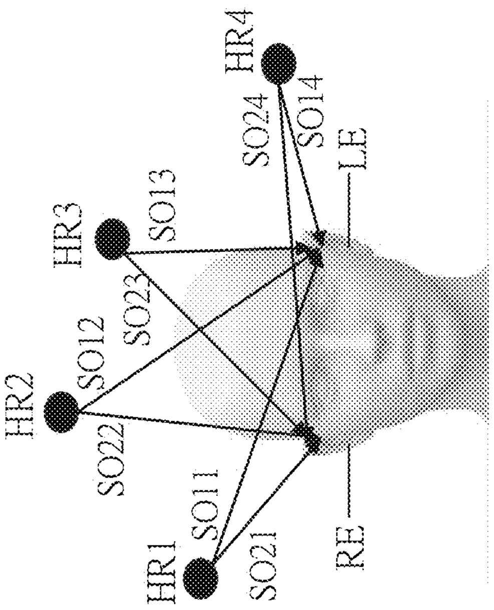
FIG. 4 illustrates a schematic diagram showing that each HRTF unit in FIG. 3 outputs a first output sound signal to the left ear and a second output sound signal to the right ear.

Please refer to FIG. 2 to FIG. 4. FIG. 2 and FIG. 3 respectively illustrate different embodiments of dividing the sound collection range of the recording device into a plurality of direction intervals and a plurality of head-related transfer function (HRTF) units respectively located in different sound direction intervals. FIG. 4 illustrates a schematic diagram showing that each HRTF unit in FIG. 3 outputs a first output sound signal to the left ear and a second output sound signal to the right ear.

As shown in FIG. 2, it is assumed that the sound collection range of the recording device 2 is a 360-degree angle, and the entire sound collection range (i.e., a 360-degree angle) is divided into a plurality of direction intervals DI1~DI7 and each direction intervals DI1~DI7 is respectively provided with head related transfer function (HRTF) units HR1~HR7. When the recording device 2 records a plurality of input sound signals, the stereo enhancement system will generate a plurality of beamforming sound signals corresponding to the plurality of direction intervals DI1~DI7 according to the plurality of input sound signals to the corresponding HRTF units HR1~HR7.

As shown in FIG. 3, it is assumed that the sound collection range of the recording device 3 is a 360-degree angle, and a part of the sound collection range (e.g., a 210-degree angle) is divided into a plurality of direction intervals DI1~DI4 and head related transfer function (HRTF) units HR1~HR4 are respectively provided in each direction intervals DI1~DI4. When the recording device 3 records a plurality of input sound signals, the stereo enhancement system will generate a plurality of beamforming sound signals corresponding to the plurality of direction intervals DI1~DI4 according to the plurality of input sound signals to the corresponding HRTF units HR1~HR4.

It should be noted that the invention does not detect a specific target direction interval through a recording device (e.g., a microphone array). The invention divides all or part of the sound collection range of the recording device into a plurality of direction intervals and the number is not limited to the above embodiment, and each angle range can be the same or different, and there is no specific limitation.

In addition, the angle ranges respectively included in the plurality of direction intervals may overlap. For example, assuming that an angle range of a direction interval DI1 is 0~30 degrees and an angle range of a direction interval DI2 is 15~45 degrees, the angle ranges respectively included in the direction intervals DI1 and DI2 overlap by 15 degrees, so as to ensure that when an object moves from the direction interval DI1 to the direction interval DI2, the sound can remain smooth.

As shown in FIG. 4, each HRTF unit HR1~HR4 respectively receives and calculates the corresponding beamforming sound signal, then outputs first output sound signals SO11~SO14 to a left ear EL and outputs second output sound signals SO21~SO24 to a right ear ER. In detail, the HRTF unit HR1 outputs the first output sound signal SO11 to the left ear EL and outputs the second output sound signal SO21 to the right ear ER; the HRTF unit HR2 outputs the first output sound signal SO12 to the left ear EL and outputs the second output sound signal SO22 to the right ear ER; the HRTF unit HR3 outputs the first output sound signal SO13 to the left ear EL and outputs the second output sound signal SO23 to the right ear ER; the HRTF unit HR4 outputs the first output sound signal SO14 to the left ear EL and outputs the second output sound signal SO24 to the right ear ER.

Figure 5:
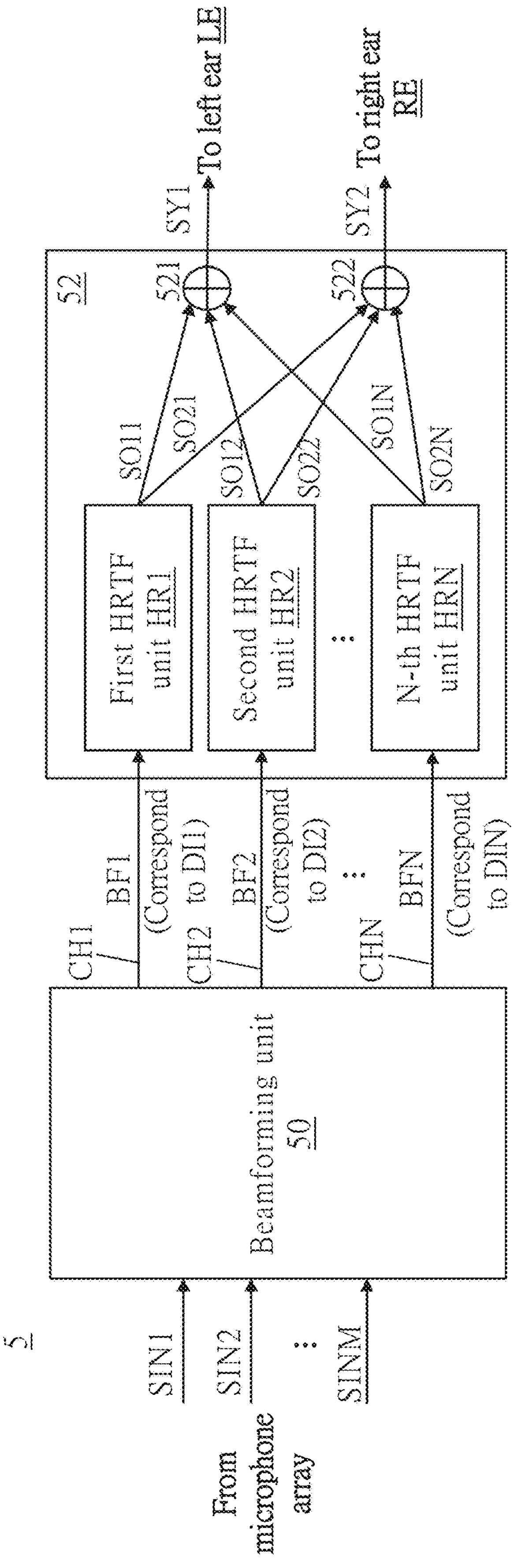
FIG. 5 illustrates a schematic diagram of a stereo enhancement system in a preferred embodiment of the invention.

Please refer to FIG. 5. FIG. 5 illustrates a schematic diagram of a stereo enhancement system in a preferred embodiment of the invention. As shown in FIG. 5, the stereo enhancement system 5 includes a beamforming unit 50 and a signal processing unit 52. When the beamforming unit 50 receives the M input sound signals SIN1~SINM, the beamforming unit 50 generates N beamforming sound signals BF1~BFN corresponding to the N direction intervals DI1~DIN respectively according to the M input sound signals SIN1~SINM. The signal processing unit 52 is coupled to the beamforming unit 50 and used for receiving the N beamforming sound signals BF1~BFN corresponding to the N direction intervals DI1~DIN respectively, and generating a first synthesized output sound signal SY1 and a second synthesized output sound signal SY2 according to the N beamforming sound signals BF1~BFN. Wherein, M and N are positive integers.

It should be noted that the first synthesized output sound signal SY1 and the second synthesized output sound signal SY2 generated by the signal processing unit 52 are transmitted to the left ear LE and the right ear RE respectively, and the sound fields of the first synthesized output sound signal SY1 and the second synthesized output sound signal SY2 will be wider than the sound field of the M input sound signals SIN1~SINM, so that when the left ear EL and the right ear RE hear the first synthesized output sound signal SY1 and the second synthesized output sound signal SY2 respectively, there will be better stereo effect.

In practical applications, the M input sound signals SIN1~SINM received by the beamforming unit 50 can come from a recording device (such as a microphone array), and the sound collection range of the recording device can be divided into N direction intervals DI1~DIN, causing the beamforming unit 50 to generate N beamforming sound signals BF1~BFN relative to all N direction intervals DI1~DIN of the recording device.

In addition, the stereo enhancement system 5 and the recording device of the invention may be designed as different devices separated from each other or integrated into the same device according to actual needs. For example, the microphone array can be disposed on a motion camera to perform sound collection and stereo enhancing process, and then stored or listened to by the user through headphones, but not limited to this.

In this embodiment, the signal processing unit 52 can include N HRTF units HR1~HRN, a first synthesis unit 521 and a second synthesis unit 522. The N HRTF units HR1~HRN are coupled to the beamforming unit 50 and correspond to the N direction intervals DI1~DIN respectively. Each of the N HRTF units HR1~HRN receives and calculates a corresponding beamforming audio signal among the N beamforming audio signals BF1~BFN to generate N first output audio signals SO11~SO1N and N second output sound signal SO21~SO2N.

The first synthesis unit 521 is coupled to the N HRTF units HR1~HRN and used for synthesizing the N first output sound signals SO11-SO1N generated by the N HRTF units HR1~HRN into a first synthesized output sound signal SY1 and then the first synthesized output sound signal SY1 is transmitted to the left ear LE. The second synthesis unit 522 is coupled to the N HRTF units HR1~HRN and used for synthesizing the N second output sound signals SO21~SO2N generated by the N HRTF units HR1~HRN into a second synthesized output sound signal SY2 and then the second synthesized output sound signal SY2 is transmitted to the right ear RE.

In practical applications, the first synthesized output sound SY1 and the second synthesized output sound SY2 can be outputted to the left ear LE and the right ear RE of the earphone respectively, but not limited to this.

Figure 6:
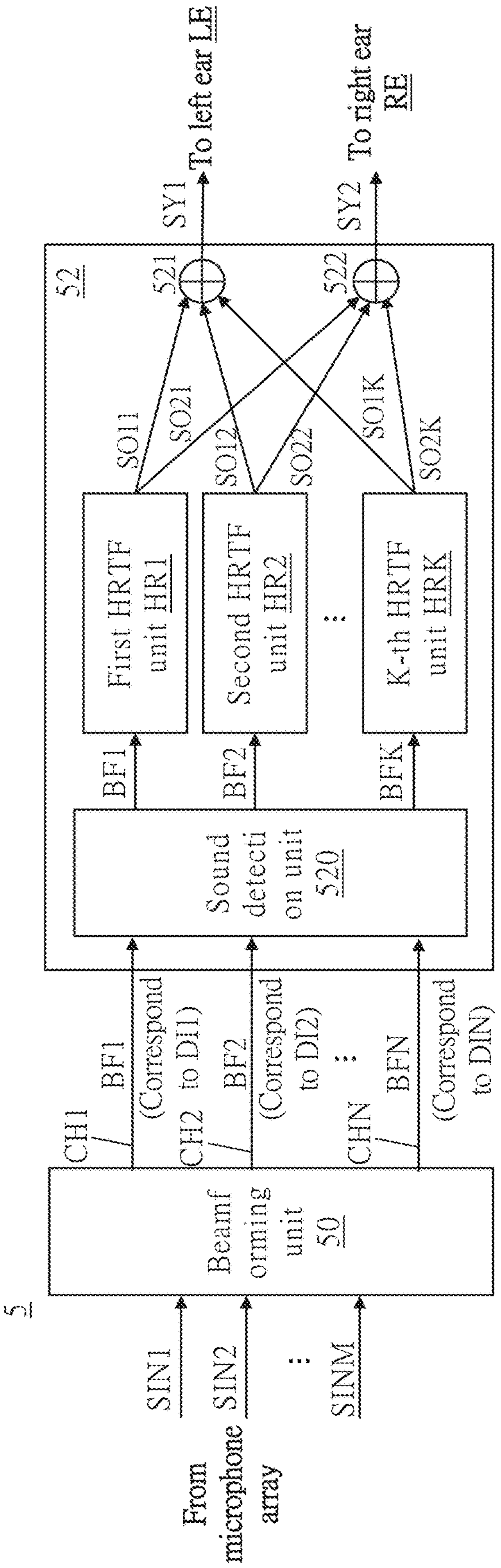
FIG. 6 illustrates a schematic diagram showing that the stereo enhancement system of the invention further includes a detection unit.

In another embodiment, as shown in FIG. 6, the signal processing unit 52 can further include a sound detection unit 520. The sound detection unit 520 is coupled between the beamforming unit 50 and the N HRTF units HR1~HRN for detecting whether the effective sound is included in the N beamforming sound signals BF1~BFN corresponding to the N direction intervals DI1~DIN respectively, and the sound detection unit 520 only outputs the K beamforming sound signals BF1~BFK including the effective sounds to the K HRTF units HR1~HRK respectively. Wherein, K is a positive integer less than or equal to N.

It should be noted that the way that the sound detection unit 520 detects whether the N beamforming sound signals BF1~BFN include the effective sounds can include but not be limited to the following two:

(1) Voice Activity Detection (VAD), which can be used to detect human voices; and (2) Sound Event Detection, which can be used to detect specific sound events, such as dog barking, doorbell, airplane sound, etc.

Next, each HRTF unit in the K HRTF units HR1~HRK receives and calculates the corresponding beamforming audio signal among the K beamforming audio signals BF1~BFK to generate K first output audio signals SO11-SO1K and K second output sound signals SO21~SO2K. The first synthesis unit 521 synthesizes the K first output sound signals SO11~SO1K into a first synthesized output sound signal SY1 and transmits it to the left ear LE. The second synthesis unit 522 synthesizes the K second output sound signals SO21~SO2K into a second synthesized output sound signal SY2 and transmits it to the right ear RE.

In practical applications, the N HRTF units HR1~HRN can adopt a real recording mode using at least one of filter, delay and gain generated from real recording or a simulation mode using at least one of filter, delay and gain generated from simulation. When the N HRTF units HR1~HRN adopt the simulation mode, each HRTF unit can include a filtering unit for simulating the level difference and the time difference between two ears, a delay unit for simulating the time difference between the two ears and/or a gain unit for simulating the level difference between the ears, but not limited to this. The signal processing unit 52 can adjust the width of the sound field of the sound signal by modifying the delays and gains of the N HRTF units HR1~HRN, but not limited to this.

Figure 7:
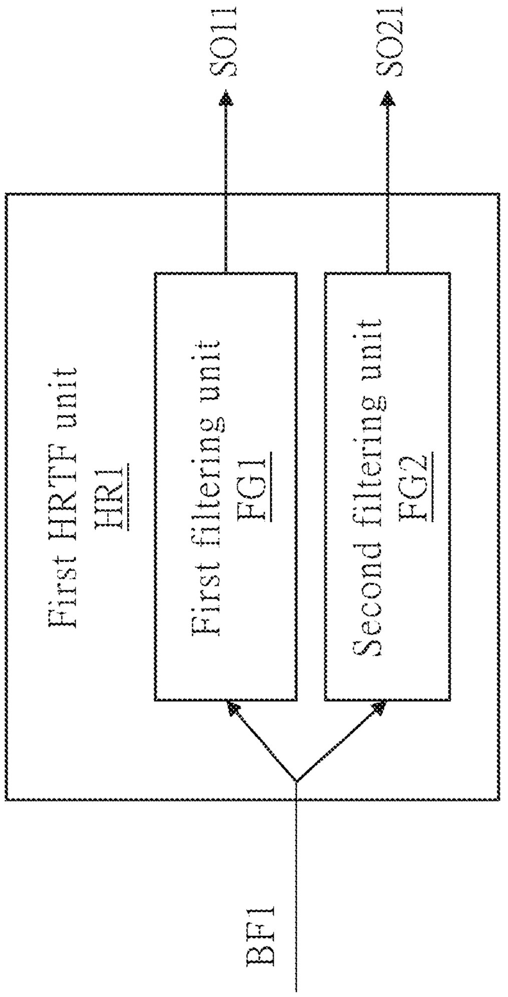
FIG. 7 illustrates a schematic diagram showing that the HRTF unit of the invention further includes two filter units corresponding to the left ear and the right ear respectively.

For example, as shown in FIG. 7, the first HRTF unit HR1 can include a first filtering unit FG1 and a second filtering unit FG2 corresponding to the left ear LE and the right ear RE respectively. When the first filtering unit FG1 receives the beamforming sound signal BF1, the first filtering unit FG1 filters the beamforming sound signal BF1 to generate a first output sound signal SO11 corresponding to the left ear LE. When the second filtering unit FG2 receives the beamforming sound signal BF1, the second filtering unit FG2 filters the beamforming sound signal BF1 to generate a second output sound signal SO21 corresponding to the right ear RE. The other HRTF units HR2~HRN can also be deduced in the same way, so no further description is given here.

Another preferred embodiment of the invention is a stereo enhancement method. In this embodiment, the stereo enhancement method can be applied to the stereo enhancement systems in the foregoing embodiments, but not limited to this.

Figure 8:
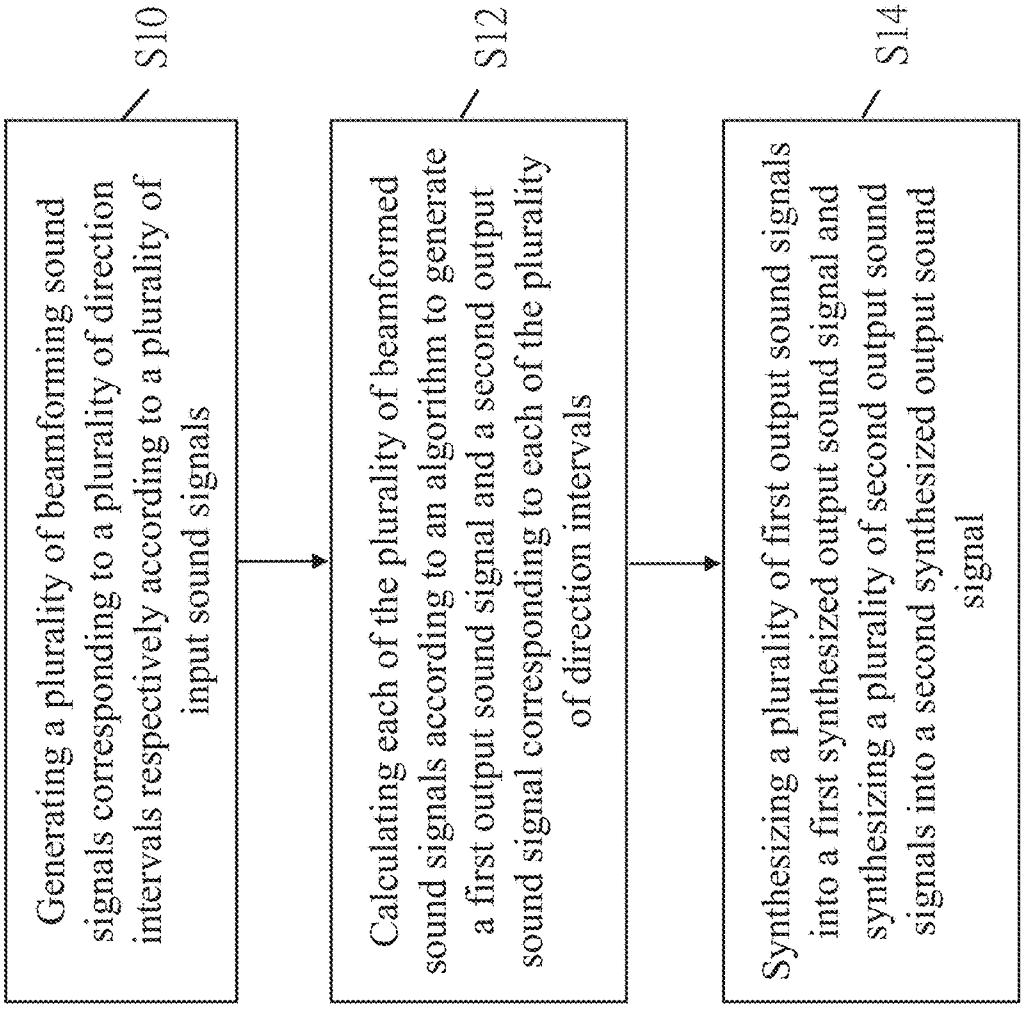
FIG. 8 illustrates a flowchart of a stereo enhancement method in a preferred embodiment of the invention.

Please refer to FIG. 8. FIG. 8 illustrates a flowchart of the stereo enhancement method in this embodiment. As shown in FIG. 8, the stereo enhancement method can include but not limited to the following steps:

Step S10: generating a plurality of beamforming sound signals corresponding to a plurality of direction intervals respectively according to a plurality of input sound signals;

Step S12: calculating each of the plurality of beamformed sound signals according to an algorithm to generate a first output sound signal and a second output sound signal corresponding to each of the plurality of direction intervals; and Step S14: synthesizing a plurality of first output sound signals into a first synthesized output sound signal and synthesizing a plurality of second output sound signals into a second synthesized output sound signal. Wherein, the sound fields of the first synthesized output sound signal and the second synthesized output sound signal are wider than the sound fields of the plurality of input sound signals, so as to achieve the effect of enhancing stereophonic sound.

In practical applications, the plurality of input sound signals in the step S10 can come from a recording device, and all or part of the sound collection range of the recording device is divided into the plurality of direction intervals, so that the step S10 can generate the plurality of beamforming sound signals relative to all direction intervals of the recording device, wherein the angle ranges included in the plurality of direction intervals respectively will overlap, but not limited to this.

In addition, the step S10 can also detect whether the plurality of beamforming sound signals corresponding to the plurality of direction intervals include effective sounds and the plurality of beamforming sound signals generated in the step S10 include the effective sounds.

In another embodiment, the stereo enhancement method can further include the following steps: adjusting the width of the sound field by modifying the gain and delay of HRTF and other techniques for simulating the response of the sound source to the left ear and the right ear channels, but not limited to this.

In another embodiment, the algorithm in the step S12 can be a head-related transfer function (HRTF) or any other technique capable of simulating the channel response of the sound source to the left ear and the right ear. In addition, the step S12 can adopt a real recording mode using at least one of filter, delay and gain generated from real recording or a simulation mode using at least one of filter, delay and gain generated from simulation. When the step S12 adopts the simulation mode, the stereo enhancement method can further include at least one of the following steps: simulating a time difference between two ears; and simulating a level difference between the two ears, but not limited to this.

Compared to the prior art, the stereo enhancement system and the stereo enhancement method of the invention separate the plurality of sound signals recorded by the microphone array into different channels corresponding to different sound direction intervals through the beamforming method, and apply head-related transfer function (HRTF) processing in each channel to enhance the spatial sense of the sound signal, so that the sound signal presents a better stereo effect, making the sound heard by the left ear and the right ear wider.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A stereo enhancement system, comprising:

a beamforming unit, configured to receive a plurality of input sound signals and generate a plurality of beamforming sound signals corresponding to a plurality of direction intervals respectively; and a signal processing unit, coupled to the beamforming unit, configured to receive the plurality of beamforming sound signals corresponding to the plurality of direction intervals respectively and generate a first synthesized output sound signal and a second synthesized sound signal accordingly;

wherein the signal processing unit comprises:

a plurality of head-related transfer function (HRTF) units, coupled to the beamforming unit and corresponding to the plurality of direction intervals respectively, and each HRTF unit in the plurality of HRTF units receiving a corresponding beamforming sound signal in the plurality of beamforming sound signals and calculating the beamforming sound signal to generate a first output sound signal and a second output sound signal;

a first synthesis unit, coupled to the plurality of HRTF units, configured to synthesize a plurality of first output sound signals generated by the plurality of HRTF units into the first synthesized output sound signal; and a second synthesis unit, coupled to the plurality of HRTF units, configured to synthesize a plurality of second output sound signals generated by the plurality of HRTF units into the second synthesized output sound signal.

2. The stereo enhancement system of claim 1, wherein there is an overlap between the angle ranges comprised in the plurality of direction intervals.

3. The stereo enhancement system of claim 1, wherein the plurality of input sound signals is from a recording device, and all or part of recording range of the recording device is divided into the plurality of direction intervals, so that the beamforming unit generates the plurality of beamforming sound signals relative to all or part of direction intervals of the recording device.

4. The stereo enhancement system of claim 1, wherein the first output sound signal and the second output sound signal generated by each HRTF unit correspond to a left ear and a right ear respectively.

5. The stereo enhancement system of claim 1, wherein the first synthesis unit and the second synthesis unit output the first synthesized output sound signal and the second synthesized output sound signal to a left ear and a right ear respectively.

6. The stereo enhancement system of claim 1, wherein sound fields of the first synthesized output sound signal and the second synthesized output sound signal are wider than sound fields of the plurality of input sound signals.

7. The stereo enhancement system of claim 1, wherein the plurality of HRTF units is operated in a real recording mode, which uses at least one of filter, delay and gain generated from real recording.

8. The stereo enhancement system of claim 1, wherein the plurality of HRTF units is operated in a simulation mode, which uses at least one of filter, delay and gain generated from simulation and comprises at least one of the following:

a filtering unit, configured to simulate a level difference and a time difference between two ears;

a delay unit, configured to simulate the time difference between the two ears; and a gain unit, configured to simulate the level difference between the two ears.

9. The stereo enhancement system of claim 1, wherein the signal processing unit further comprises:

a sound detection unit, coupled between the beamforming unit and the plurality of HRTF units, configured to detect whether the plurality of beamforming sound signals corresponding to the plurality of direction intervals comprises effective sounds and output beamforming sound signals comprising the effective sounds to the plurality of HRTF units respectively, and the effective sounds are audible sounds comprising human voices and specific sound events.

10. The stereo enhancement system of claim 1, wherein the signal processing unit adjusts a width of a sound field by modifying a delay and a gain of the plurality of HRTF units.

11. A stereo enhancement method, comprising the following steps:

(a) generating a plurality of beamforming sound signals corresponding to a plurality of direction intervals according to a plurality of input sound signals respectively;

(b) calculating each of the plurality of beamforming sound signals according to an algorithm to generate a first output sound signal and a second output sound signal corresponding to each of the plurality of direction intervals; and (c) synthesizing a plurality of first output sound signals into a first synthesized output sound signal and synthesizing a plurality of second output sound signals into a second synthesized output sound signal;

wherein sound fields of the first synthesized output sound signal and the second synthesized output sound signal are wider than sound fields of the plurality of input sound signals.

12. The stereo enhancement method of claim 11, wherein the algorithm is a head-related transfer function (HRTF) or a technology simulating a channel response of a sound source to a left ear and a right ear.

13. The stereo enhancement method of claim 12, wherein the step (a) further detects whether the plurality of beamforming sound signals corresponding to the plurality of direction intervals comprises effective sounds and the plurality of beamforming sound signals generated in the step (a) comprises the effective sounds, and the effective sounds are audible sounds comprising human voices and specific sound events.

14. The stereo enhancement method of claim 12, further comprising the following steps:

adjusting a width of a sound field by modifying a gain and a delay of HRTF and other techniques simulating channel response of the sound source to the left ear and the right ear.

15. The stereo enhancement method of claim 12, wherein there is an overlap between the angle ranges comprised in the plurality of direction intervals.

16. The stereo enhancement method of claim 12, wherein the plurality of input sound signals is from a recording device, and all or part of recording range of the recording device is divided into the plurality of direction intervals, so that the step (a) generates the plurality of beamforming sound signals relative to all or part of direction intervals of the recording device.

17. The stereo enhancement method of claim 12, wherein the step (b) is operated in a real recording mode, which uses at least one of filter, delay and gain generated from real recording.

18. The stereo enhancement method of claim 12, wherein the step (b) is operated in a simulation mode, which uses at least one of filter, delay and gain generated from simulation and the stereo enhancement method further comprises at least one of the following:

simulating a time difference between two ears; and simulating a level difference between the two ears.

* * * * *